UNITED STATES PATENT OFFICE.

HENRY DESBOROUGH PHILLIPS, OF INDIANAPOLIS, INDIANA.

COMPOSITION OF MATTER FOR THE MANUFACTURE OF BUILDING-BRICKS.

954,693.　　　　Specification of Letters Patent.　　Patented Apr. 12, 1910.

No Drawing.　　Application filed October 4, 1909.　Serial No. 520,851.

*To all whom it may concern:*

Be it known that I, HENRY D. PHILLIPS, of Indianapolis, in the county of Marion and State of Indiana, have invented certain new and useful Improvements in Composition of Matter for the Manufacture of Building-Bricks; and I do hereby declare the following to be a full, clear, and exact description of the invention, such as will enable others skilled in the art to which it appertains to make and use the same.

My invention relates to an improved composition of matter for the manufacture of building bricks,—the object being to produce a brick which will possess great hardness and be impervious to water.

The composition consists of the following ingredients, combined in substantially the proportions stated,—viz:

| | |
|---|---|
| Cement | 100 pounds. |
| Sand | 4 times the bulk of the cement. |
| Arsenious acid | 6 pounds. |
| Mica crystal (mesh No. 60) | 4 pounds. |
| Blue vitrol (pulverized) | 3 pounds. |
| Sulfur (pulverized) | 1 pound. |

The process of manufacture is as follows: The cement and chemicals are thoroughly mixed in the dry state, after which the sand is added together with about 10 per cent. of water and the whole batch thoroughly agitated and mixed. When the ingredients have been mixed in the manner set forth, the mass is passed through a press and molded into brick form. The bricks are then placed on cars and dried in the open air for five (5) hours, and finally the cars are run into cylinders where the air dried bricks are exposed to steam pressure for a period of twenty-four (24) hours.

The bricks may be made in different colors by the addition of suitable oxids, which latter may be best introduced when the cement and chemicals are assembled and mixed in the dry state.

In the manufacture of bricks for the purpose stated, the use of the ingredients in substantially the proportions above specified, is essentially important.

Having fully described my invention what I claim as new and desire to secure by Letters-Patent, is,—

The herein described composition of matter for making building brick, consisting of cement, sand, arsenious acid, mica crystals blue vitriol and sulfur, in the proportions substantially as specified.

In testimony whereof, I have signed this specification in the presence of two subscribing witnesses.

HENRY DESBOROUGH PHILLIPS.

Witnesses:
　LEANDER L. LOUIS,
　HALLIE G. SIEHR.